United States Patent [19]
Eller et al.

[11] Patent Number: 6,124,368
[45] Date of Patent: Sep. 26, 2000

[54] METHOD FOR PRODUCING POLYTETRAHYDROFURAN

[75] Inventors: Karsten Eller, Ludwigshafen; Christoph Sigwart, Schriesheim; Rainer Becker, Bad Dürkheim; Klaus-Dieter Plitzko, Limburgerhof, all of Germany

[73] Assignee: BASF Aktiengesellschaft, Ludwishafen, Germany

[21] Appl. No.: 09/445,700

[22] PCT Filed: Jun. 10, 1998

[86] PCT No.: PCT/EP98/05319

§ 371 Date: Dec. 13, 1999

§ 102(e) Date: Dec. 13, 1999

[87] PCT Pub. No.: WO98/58982

PCT Pub. Date: Dec. 30, 1998

[30] Foreign Application Priority Data

Jun. 23, 1997 [DE] Germany .................. 197 26 507

[51] Int. Cl.⁷ .............. C08J 9/00; C08G 59/00; C07D 307/02
[52] U.S. Cl. ............ 521/90; 528/417; 549/472
[58] Field of Search .......... 549/472; 528/417; 521/90

[56] References Cited

U.S. PATENT DOCUMENTS

| | | | |
|---|---|---|---|
| 4,108,809 | 8/1978 | Narayan et al. | 521/136 |
| 4,792,627 | 12/1988 | Aoshima et al. | 564/487 |
| 5,149,862 | 9/1992 | Dorai et al. . | |
| 5,344,964 | 9/1994 | Chu et al. | 560/240 |
| 5,371,276 | 12/1994 | Chu et al. . | |
| 5,463,020 | 10/1995 | Becker et al. | 528/408 |
| 5,773,648 | 6/1998 | Becker et al. . | |

FOREIGN PATENT DOCUMENTS

| | | |
|---|---|---|
| 96/09335 | 3/1996 | WIPO . |
| 98/24829 | 6/1998 | WIPO . |

*Primary Examiner*—Deborah C. Lambkin
*Attorney, Agent, or Firm*—Keil & Weinkauf

[57] ABSTRACT

The invention relates to a method for producing polytetrahydrofuran, polytetrahydrofuran copolymers, diesters or monoesters of these polymers by polymerization of tetrahydrofuran in the presence of at least one telogene and/or comonomer on a sulfate-containing heterogeneous supported catalyst. A sulfate-containing heterogeneous supported catalyst is used containing at least one metal sulfate, metal hydrogen sulfate, metal oxide sulfate or mixtures thereof.

10 Claims, 1 Drawing Sheet

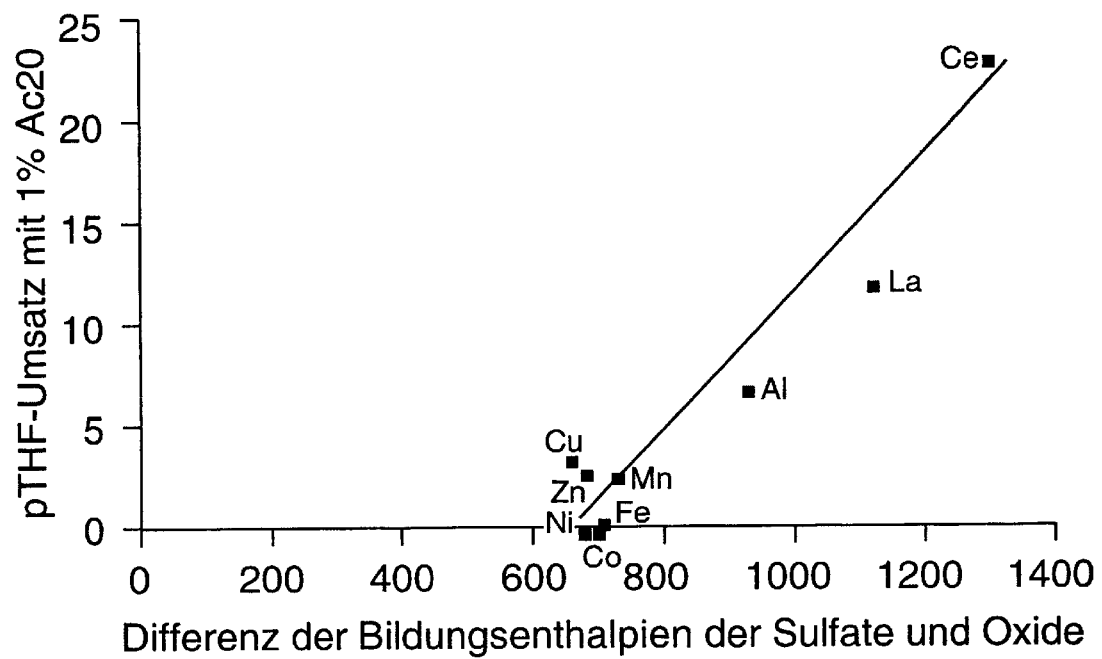

METHOD FOR PRODUCING POLYTETRAHYDROFURAN

This application is a 371 of PCT/EP95/05319 Jun. 10, 1998.

The present invention relates to an improved process for the preparation of polytetrahydrofuran, polytetrahydrofuran copolymers, diesters or monoesters of these polymers by the polymerization of tetrahydrofuran in the presence of at least one telogen and/or comonomer over a heterogeneous supported catalyst containing at least one metal sulfate, metal hydrogensulfate or metal oxysulfate.

Polytetrahydrofuran ("PTHF"), also known as poly (oxybutylene glycol), is a broadly used intermediate in the plastics and synthetic fiber industry and serves inter alia for the preparation of polyurethane, polyester and polyamide elastomers. In addition, it is, as are also some of its derivatives, a valuable auxiliary for many applications, such as dispersing agents or for the process of decolorizing ("de-inking") waste paper.

PTHF is advantageously prepared on an industrial scale by polymerization of tetrahydrofuran over catalysts in the presence of reagents, the addition of which makes it possible to control the chain length of the polymer chains and thus to set the average molecular weight to the desired value (chain-terminating agents or "telogens"). The control takes place in this case by varying the type and amount of the telogen. By selecting suitable telogens functional groups can be additionally introduced at one or both ends of the polymer chain. Thus for example by using carboxylic acids or carboxylic anhydrides as telogens the monoesters or diesters of PTHF can be prepared.

Other telogens are effective not only as chain-terminating agents, but are also incorporated in the growing polymer chain of the PTHF, that is to say they not only operate as a telogen, but also as a comonomer and can therefore be equally well designated as a telogen or as a comonomer. Examples of such comonomers are water or telogens containing two hydroxy groups such as the di-alcohols. Examples of such di-alcohols are ethylene glycol, butylene glycol, butane-1,4-diol, hexane-1,6-diol or low molecular weight PTHF Other suitable comonomers are 1,2-alkylene oxides such as ethylene oxide or propylene oxide, 2-methyltetrahydrofuran or 3-methyltetrahydrofuran. The use of such comonomers, except water, butane-1,4-diol and low-molecular THF, leads to the preparation of tetrahydrofuran copolymers. In this manner it is possible to chemically modify the PTHF. One example thereof is the use of the telogen 2-butyne-1,4-diol, the addition of which causes a proportion of C≡C triple bonds to be present in the polymer chains of the PTHF.

Such modified PTHF can, due to the reactivity of these triple bonds, be further refined chemically at these sites, for example by hydrogenation of the triple bonds to double bonds, by subsequent addition polymerization of different monomers ("grafting") for varying the properties of the polymer, cross linkage for the formation of polymers having a comparatively rigid structure, or other measures commonly used in polymer chemistry. Total hydrogenation of the triple bonds that are present is likewise possible and generally leads to PTHF having a particularly low color index.

DE-A 44 33 606 describes a process for the preparation of PTHF, PTHF diesters of $C_2$–$C_{20}$ monocarboxylic acids or PTHF monoesters of $C_1$–$C_{10}$ monocarboxylic acids by the polymerization of tetrahydrofuran over a heterogeneous catalyst in the presence of one of the telogens water, butane-1,4-diol, PTHF having a molecular weight of 200 to 700 dalton, a $C_1$–$C_{10}$ monocarboxylic acid or a carboxylic anhydride derived from $C_2$–$C_{20}$ monocarboxylic acids or mixtures of these telogens, where the catalyst is an optionally sulfate-doped supported catalyst, which contains a catalytically active amount of an oxygen-containing tungsten or molybdenum compound or mixtures of these compounds on an oxidic support material and which, following application of the precursor compounds of the oxygen-containing molybdenum and/or tungsten compounds to the support material precursor, has been calcined at temperatures of 500° C. to 1000° C.

U.S. Pat. No. 5,149,862 describes a process for the preparation of PTHF or PTHF diacetates by the polymerization of tetrahydrofuran over sulfate-doped zirconium dioxide in the presence of a mixture of acetic acid and acetic anhydride. The sulfate-doped zirconium dioxide catalyst is prepared by impregnating freshly precipitated zirconium hydroxide with sulfuric acid followed by calcination. A disadvantage of the catalysts used is, on the one hand, the elaborate, difficultly reproducible and fresh precipitation of zirconium hydroxide that is necessary for the preparation thereof. The calcination taking place following impregnation with sulfuric acid causes the zirconium hydroxide to be converted to the catalyst, but also a considerable portion of the sulfate to be burned. The finished catalyst has only low sulfate contents of up to 2 wt % and it is not possible to establish a specific sulfate content of the catalyst.

U.S. Pat. No. 5,371,276 teaches a process for the preparation of polyalkylene ether diacetates from cyclic ethers by polymerization over sulfate-doped oxides in the presence of a mixture of acetic acid and acetic anhydride. The sulfate-doped oxidic catalyst is prepared by impregnation of the oxides with sulfuric acid, ammonium sulfate or ammonium sulfite solutions followed by calcination. Due to the fact that the calcination takes place following impregnation, it is not possible, as mentioned above in respect of U.S. Pat. No. 5,149,862, to prepare catalysts having a high and/or defined sulfate content.

Since the economical value of a PTHF process catalyzed using a heterogeneous catalyst greatly depends on the productivity of the catalyst, it is an object of the present invention to provide a sulfate-doped oxidic catalyst having a defined sulfate content in order to achieve higher polymer yields.

Accordingly, we have found an improved process for the preparation of polytetrahydrofuran, polytetrahydrofuran copolymers, diesters or monoesters of these polymers by the polymerization of tetrahydrofuran in the presence of at least one telogen and/or comonomer over a heterogeneous supported catalyst containing sulfate, which is characterized in that the sulfate-containing heterogeneous supported catalyst contains at least one metal sulfate, metal hydrogensulfate, metal oxysulfate or a mixture thereof.

Suitable support materials are in general oxidic supports such as silicon dioxide, aluminum oxide, titanium oxide, zirconium dioxide, hafnium oxide, yttrium oxide, tin(IV) oxide, iron(III) oxide or mixtures of these oxides, but we prefer to use silicon dioxide, aluminum oxide, titanium oxide, or zirconium dioxide, whilst silicon dioxide is particularly preferred. Other support materials may be used, if desired, provided they guarantee a sufficiently strong bonding of the metal sulfate, metal hydrogensulfate and/or metal oxysulfate under the reaction conditions.

The support materials used for the preparation of the catalyst used in the invention have a surface area of from 20 to 500 m²/g, preferably from 50 to 200 m²/g and more preferably from 75 to 150 m²/g. The surface area of the support, which also has an influence on the greatest possible amount of metal sulfate, metal hydrogensulfate and/or metal oxysulfate which can be applied, is determined by the BET method by $N_2$ adsorption, particularly as specified in DIN 66,131.

By metal sulfates we mean the pure sulfates of mono to tetravalent metals, by metal hydrogensulfates we mean hydrogensulfates of mono to tetravalent metals and by metal oxysulfates we mean compounds of the type $M(IV)OSO_4$, where M stands for metal.

The metal sulfates, metal hydrogensulfates and/or metal oxysulfates present in the catalyst used in the present invention may be those of metals in Group 1 (Li, Na, K, Rb, Cs), Group 3 (Sc, Y, La) including the lanthanides (Ce, Pr, Nd, Pm, Sm, Eu, Gd, Tb, Dy, Ho, Er, Tm, Yb, Lu), Group 4 (Ti, Zr, Hf), Group 7 (Mn, Re), Group 8 (Fe, Ru, Os), Group 10 (Ni, Pd, Pt), Group 11 (Cu, AG, Au), Group 12 (Zn) and Group 13 (Al) of the Periodic Table.

We prefer to use the sulfates of Sc, Y, La, the lanthanides, Al, Cu, Ni, Zn, Mn(II), sodium hydrogensulfate, titanium oxysulfate, zirconium oxysulfate or mixtures thereof, and we especially prefer to use cerium(IV) sulfate, lanthanum (III) sulfate, yttrium(III) sulfate or mixtures thereof.

Without binding ourselves to a model, we assume that there is an empirical correlation between the resistance of the sulfates to elimination of $SO_3$ and their activity in the THF polymerization. For this reason FIG. 1 shows the difference between the standard enthalpy of formation of the sulfates and the oxides formed by elimination of $SO_3$ (in each case based on one atom of metal) plotted against THF conversion.

The catalyst used in the invention contains from 2 to 30 wt %, based on the total weight of the catalyst, of a metal sulfate, metal hydrogensulfate, metal oxysulfate or mixture thereof, preferably from 2 to 20 wt % and more preferably from 7 to 17 wt %.

The preparation of the catalysts used in the process of the invention takes place by applying a solution of the metal sulfate, metal hydrogensulfate, metal oxysulfate or mixture thereof in an amount of water corresponding to the maximum water uptake of the respective support to the support after this has been dried at 80 to 600° C. and then drying or calcining the thus treated support at temperatures of from 80 to 300° C. under standard pressure or reduced pressure, preferably under a pressure of from 0.0005 to 1 bar.

The maximum water uptake of the respective support material is determined by titration of the dried support with water until the surface just remains wet.

Application may be carried out by impregnating the support with an aqueous solution of the metal sulfate, metal hydrogensulfate and/or metal oxysulfate, by spraying said solution onto the support or by some other suitable method. By varying the concentration of the metal sulfate, metal hydrogensulfate and/or metal oxysulfate in this aqueous solution it is possible to achieve a specific content of metal sulfate, metal hydrogensulfate and/or metal oxysulfate in the catalyst.

In the case of difficultly water-soluble metal sulfate, metal hydrogensulfate and/or metal oxysulfate, by which we mean, in this application, that the amount of the metal sulfate, metal hydrogensulfate and/or metal oxysulfate which is required to give a specific content (in wt %) is not soluble in the amount of water that corresponds to the maximum water uptake of the respective support, the application of the solution can be repeated until the desired amount of metal sulfate, metal hydrogensulfate and/or metal oxysulfate has been applied, the catalyst being dried under the aforementioned conditions between applications.

To the aqueous solutions of the difficulty water-soluble metal sulfates, metal hydrogensulfates and/or metal oxysulfates there can be added another solvent, such as an alcohol and/or volatile or decomposable solubilizing compound provided it has no impairing action on the catalyzed polymerization of THF and/or is decomposed under the drying conditions used for the catalyst without leaving a residue. Suitable solubilizing compounds are for example ammonia, sulfates such as ammonium sulfate or ammonium hydrogensulfate, oxalic acid, citric acid, sulfuric acid or ethylenediamine tetraacetic acid.

Another method of applying difficulty water-soluble metal sulfates, metal hydrogensulfates and/or metal oxysulfates to the support, however, is to apply, in a first step, an aqueous solution of a highly water-soluble salt of the desired metal cation or the metal oxide cation, for example an acetate, nitrate, citrate, oxalate or chloride, to the support and then to dry the support and, in a second step, to apply thereto a stoichiometric amount or an excess of a sulfate-containing and/or hydrogensulfate-containing aqueous solution, for example sulfuric acid, soluble sulfates such as ammonium sulfate or ammonium hydrogensulfate, in order to precipitate the desired metal sulfate, metal hydrogensulfate, metal oxysulfate or mixture thereof onto the support.

The thus treated supports are then dried under the drying conditions stated above. It is also possible to reverse the order of these application steps and first of all to apply the aqueous solution containing sulfate and/or hydrogensulfate and, following intermediate drying, to apply an aqueous solution of a highly water-soluble salt of the desired metal cation or metal oxide cation to the support which is finally dried.

The catalysts which can be used in the present invention may be employed in the process of the invention for the polymerization of THF in the form of powder, for example when the process is carried out in suspension, or advantageously as shaped particles, eg in the form of cylinders, balls, rings, spirals or chips, especially when the catalyst is present in a fixed bed, as is preferred when use is made of, say, loop reactors or the is process is carried out continuously.

When the catalysts used in the present invention are in the form of shaped particles the application of the metal sulfates, metal hydrogensulfates, metal oxysulfates or mixtures thereof by the process described above is preferably effected on the support after it has been shaped. Alternatively, however, it is possible to apply the metal sulfates, metal hydrogensulfates, metal oxysulfates or solution containing mixtures thereof to the powder and then to mold the powder.

Suitable telogens, ie substances which terminate chain growth in the polymerization reaction, are, for the preparation of PTHF diesters, carboxylic anhydrides derived from $C_2$–$C_{20}$ monocarboxylic acids, such as acetic anhydride, propionic anhydride and butyric anhydride. The PTHF diester resulting from the use of these telogens can be converted to PTHF by various processes (eg as described in U.S. Pat. No. 4,460,796).

Suitable telogens for the preparation of the PTHF monoesters of monocarboxylic acids are in general $C_1$–$C_{20}$ monocarboxylic acids, preferably $C_1$–$C_8$ monocarboxylic acids and more preferably formic acid, acetic acid, propionic acid, 2-ethylhexanoic acid, acrylic acid and methacrylic acid.

A suitable telogen for the preparation of copolymers of THF is butyne-1,4-diol. The resulting copolymer can then be converted to PTHF by hydrogenation of the triple bonds, but has interesting properties in itself.

Other copolymers of THF can be obtained by the use of 1,2-alkyleneoxides, preferably ethylene oxide or propylene oxide, 2-methyl tetrahydrofuran, 3-methyl tetrahydrofuran or diols such as ethylene glycol or hexane-1,6-diol.

When use is made of the telogens water and/or butane-1,4-diol in the process of the invention, the PTHF in obtained in a single step. If desired, low molecular weight, open-chain PTHF having a molecular weight of from 200 to 700 dalton may be recycled as telogen to the polymerization reaction, where it is converted to PTHF of higher molecular weight. Since butane-1,4-diol and low molecular weight PTHF have two hydroxy groups, they not only act as telogens on the ends of the PTHF chain, but are also incorporated in the PTHF chain as monomers.

The telogen is advantageously fed to the polymerization reaction dissolved in the THF. Since the telogen causes termination of the polymerization reaction, the amount of telogen used governs the average molecular weight the PTHF or PTHF diester. The more telogen which is present in the reaction mixture the lower the average molecular weight of the PTHF or respective PTHF derivative. Depending on the telogen content of the polymerization mixture the average molecular weight of the resulting PTHF or respective PTHF derivative can be adjusted to from 250 to 10,000. The process of the invention preferably produces PTHF or respective PTHF derivatives having average molecular weights of from 500 to 10,000 dalton and more preferably from 650 to 5000 dalton.

Polymerization is generally carried out at temperatures of from 0° to 80° C. and preferably from 25° C. to the boiling point of THF. The pressure used does not usually critically affect the result of the polymerization, for which reason the process is generally carried out under atmospheric pressure or the autogenous pressure of the polymerization system. Exceptions thereto are copolymerizations of THF with the readily volatile 1,2-alkylene oxides, which are advantageously carried out under pressure.

To avoid the formation of ether peroxides, the polymerization is advantageously carried out under an inert gas atmosphere. Examples of suitable inert gases are nitrogen, hydrogen, carbon dioxide or the noble gases, preferably nitrogen.

It is particularly advantageous to carry out the polymerization under a blanket of hydrogen. This embodiment results in a particularly low color index of the polymers formed. The hydrogen partial pressure used can be between 0.1 and 50 bar. If, when polymerization is carried out in the presence of hydrogen, the calcium montmorillonites are doped with transition metals in Groups 7 to 10 of the Periodic Table, for example ruthenium, rhenium, nickel, iron, cobalt, palladium and/or platinum, the color index can be further improved.

The process of the invention can be carried out continuously or batchwise, the continuous mode of operation being usually preferred for economical reasons.

When the process is carried out batchwise, the reactants THF, the respective telogen and the catalyst are caused to react generally in a stirred boiler or loop reactor at the temperatures stated until the desired conversion of THF has been achieved. The reaction time can, depending on the weight of catalyst added, be from 0.5 to 40 hours, preferably from 1 to 30 hours. The catalysts are fed to the polymerization generally in a concentration of from 1 to 90 wt %, preferably from 4 to 70 wt % and more preferably from 8 to 60 wt %, based on the weight of THF used.

For purification purposes in the case of a batchwise process, the effluent is separated from the catalyst present therein advantageously by filtration, decanting or centrifugation. Once the polymerization effluent has been freed from catalyst, it is generally purified by distillation, whilst unconverted THF is advantageously removed by distillation and then, if desired, low molecular weight PTHF oligomers are separated from the polymer by distillation under reduced pressure.

EXAMPLES

Preparation of catalyst

Catalyst A: 10% $CuSO_4/SiO_2$ 20 g of $SiO_2$ extrudates were dried overnight at 120° C. and then cooled to room temperature, after which a solution of 3.5 g of $CuSO_4.5H_2O$ in 30 g of water was uniformly added, so that all of the extrudates were completely wetted, and the solution was allowed to stand for 60 min. Following the removal of excess water in a rotation evaporator the extrudates were dried for 16 h at 200° C. under a pressure of 1 mbar.

Catalyst B: 10% $NiSO_4/Al_2O_3$ 20 g of $Al_2O_3$ extrudates were dried overnight at 120° C. and then cooled to room temperature, after which a solution of 3.8 g $NiSO_4.6H_2O$ in 30 g of water was uniformly added, so that all of the extrudates were completely wetted, and the solution was allowed to stand for 60 min. Following the removal of excess water in a rotation evaporator the extrudates were dried for 16 h at 200° C. under a pressure of 1 mbar.

Catalyst C: 10% $TiOSO_4/SiO_2$ 20 g of $SiO_2$ extrudates were dried overnight at 120° C. and then cooled to room temperature, after which a solution of 2.2 g of $TiOSO_4$ in 30 g of water was uniformly added, so that all of the extrudates were completely wetted, and the solution was allowed to stand for 60 min. Following the removal of excess water in a rotation evaporator the extrudates were dried for 16 h at 200° C. under a pressure of 1 mbar.

Catalyst D: 10% $Al_2(SO_4)3/SiO_2$ 20 g of $SiO_2$ extrudates were dried overnight at 120° C. and then cooled to room temperature, after which a solution of 3.9 g of $Al_2(SO_4)_3.xH_2O$ in 30 g of water was uniformly added, so that all of the extrudates were completely wetted, and the solution was allowed to stand for 60 min. Following the removal of excess water in a rotation evaporator the extrudates were dried for 16 h at 200° C. under a pressure of 1 mbar.

Catalyst E: 10% $Ce(SO_4)_2/SiO_2$ 50 g of $SiO_2$ extrudates were dried overnight at 120° C. and then cooled to room temperature, after which a solution of 6.8 g of $Ce(SO_4)_2$ in 50 g of water was uniformly added, so that all of the extrudates were completely wetted, and the solution was allowed to stand for 60 min. Following the removal of excess water in a rotation evaporator the extrudates were dried for 16 h at 200° C. under a pressure of 1 mbar. According to X-ray fluorescence analysis Catalyst E contained 4 wt % of cerium (theoretical cerium content: 4 wt %). Pyrolysis of Catalyst E followed by IR detection gave a content of 2 wt % of sulfur (theoretical sulfur content: 2 wt %). The surface area (BET) was 123 $m^2g^{-1}$.

Catalyst F: 10% $Ce(SO_4)_2/SiO_2$

Catalyst F was prepared in a manner similar to that described for Catalyst E but using a batch three times larger. The catalyst F contained 4 wt % of Ce (X-ray fluorescence analysis) and 2 wt % sulfur (pyrolysis with subsequent IR detection). The surface area (BET) was 130 $m^2g^{-1}$.

Catalyst G: 10% $Ce(SO_4)_2/SiO_2$ 15 g of $SiO_2$ extrudates were dried overnight at 120° C. and then cooled to room temperature, after which a solution of 1.9 g of $Ce(SO_4)_2$ in 11.5 g water was uniformly added, so that all of extrudates were completely wetted, and the solution was allowed to stand for 60 min. Following the removal of excess water in a rotation evaporator the extrudates were dried over a period of 16 h at 200° C. under a pressure of 1 mbar. Catalyst G contained of wt % of Ce (X-ray fluorescence analysis) and 2 wt % of sulfur (pyrolysis with subsequent IR detection).

Catalyst H: 12% $La_2(SO_4)3/SiO_2$ 50 g of $SiO_2$ extrudates were dried overnight at 150° C. and then cooled to room temperature, after which a solution of 9.9 g of $LaCl_3$ in 35.1 g of water was uniformly added, so that all of extrudates were completely wetted, and the solution was allowed to stand for 60 min. Following the removal of excess water in a rotation evaporator the extrudates were again dried overnight at 150° C. Following cooling to room temperature they were admixed with a mixture of 6.1 g of sulfuric acid (97% ) in 38.9 g of water, again dried overnight in a rotation evaporator at 150° C. and then dried over a period of 16 h at 200° C. under a pressure of 1 mbar. Catalyst H contained 5.8 wt % of lanthanum (X-ray fluorescence analysis) and 3 wt % of sulfur (pyrolysis with subsequent IR detection). The surface area (BET) was 123 $m^2g^{-1}$.

Catalyst I: 4% $La_2(SO_4)_3/SiO_2$ 40 g of $SiO_2$ extrudates were dried overnight at 120° C. and following cooling to room temperature, covered by a layer of a solution of 1.1 g of $La_2(SO_4)3.xH_2O$ in 105 mL $H_2SO_4$ (20%), which was allowed to stand for 60 min. Following the removal of excess water in a rotation evaporator the extrudates were dried overnight at 120° C. and impregnation with a further 1.1 g of $La_2(SO_4)3.xH_2O$ in 105 mL of $H_2SO_4$ (20%) was repeated. Following the removal of excess water in a rotation evaporator the extrudates were washed with distilled water until the eluates were free from sulfate and then again dried, at first at 120° C. and then for 16 hat 200° C. and a pressure of 1 mbar. The surface area (BET) was 104 $m^2g^{-1}$.

Catalyst J: 4% $Y_2(SO_4)_3/SiO_2$ 40 g of $SiO_2$ extrudates were dried overnight at 120° C. and following cooling to room temperature covered by a layer of a solution of 2.1 9 of $Y_2(SO_4)_3.8H_2O$ in 105 mL $H_2SO_4$ (20%) which was allowed to stand for 60 min. Following the removal of excess water in a rotation evaporator the extrudates were dried for 2 h at 120° C. and then for 16 h at 200° C. and a pressure of 1 mbar.

Catalyst K: 10% $TiOSO_4/ZrO_2$ 20 g of $ZrO_2$ pellets (3×3 mm) were dried overnight at 120° C. and, following cooling to room temperature, uniformly admixed with a solution of 2.2 g of $TiOSO_4$ in 30 g water, so that all of the pellets were completely wetted and the solution was allowed to stand for 60 min. Following the removal of excess water in a rotation evaporator the pellets were dried for 16 h at 200° C. and a pressure of 1 mbar.

Catalyst V1

As described in example 1 of U.S. Pat. No. 5,371,276, zirconium hydroxide was precipitated from an aqueous zirconium oxynitrate solution with a 10% strength ammonia solution, after which it was separated by filtration and dried.

1.5 kg of the dried precipitate were impregnated with 532 g of 1 N $H_2SO_4$ over a period of 1 hour, again dried and, following drying, compressed to 3×3 mm pellets, which were then calcined at 550° C.

THF polymerization

The distribution of molecular weights, designated below as dispersity D, was calculated from the weight average of the molecular weight ($M_w$) divided by the number average of the molecular weight ($M_n$) according to the following equation $$D=M_w/M_n.$$

The average molar mass ($M_n$) of the polymers prepared in the following examples were determined by gel permeation chromatography (GPC), a standardized polystyrene being used for calibration. From the chromatograms obtained the number average $M_n$ was calculated using the following equation $$M_n=\Sigma c_i/\Sigma(c_i/M_i),$$

in which $c_i$ stands for the concentration of the individual polymer species i in the resulting polymer mixture and $M_i$ denotes the molecular weight of the individual polymer species.

THF batch polymerization

The batch polymerization experiments were carried out under a blanket of nitrogen in glass flasks having a capacity of 100 mL and equipped with reflux condensers. 5 g of shaped catalyst particles, which had been dried, prior to use, for 18 hours at 180° C./0.3 mbar to remove adsorbed water, were heated in 10 g of THF (water content 30 ppm) containing 1% of acetic anhydride (AcA) for 5 hours at 60° C. To the reaction mixture there was then added aqueous THF (5 wt % $H_2O$), and the catalyst was separated by filtration and/or centrifugation. The catalyst was washed three times with 40 g of THF each time and the filtrates were combined and concentrated at 70° C./20 mbar in a rotation evaporator. The polytetrahydrofuran obtained as distillation residues was weighed. The table below lists the results of the experiments carried out on the catalysts A to E and G to K used in the present invention.

Table 1 also shows a comparison between the experimental results obtained on Catalyst K of the invention and Catalyst V1 of U.S. Pat. No. 5,371,276.

TABLE 1

| | | |
|---|---|---|
| 1 | A | 3.4 |
| 2 | B | 3.0 |
| 3 | C | 8.5 |
| 4 | D | 6.9 |
| 5 | E | 23.1 |
| 6 | G | 24.5 |
| 7 | H | 11.2 |
| 8 | I | 12.0 |
| 9 | J | 8.6 |
| 10 | K | 3.6 |
| C1 | C1 | 0.6 |

Continuous THF polymerization

A fixed bed reactor having a capacity of 125 mL was filled, under argon, with 57 g of the $Ce(SO_4)_2/SiO_2$ catalyst F after this had been dried for 15 h at 180° C./0.3 mbar. The reactor was operated in straight pass ascending mode. Using a reactor temperature of 60° C., there were metered in 5 g of THF/h having a content of acetic anhydride of 1 wt % corresponding to a space velocity of 0.04 $kg_{THF}L_{cat}^{-1}h^{-1}$. When the THF conversion had reached a steady state the effluent was worked up by separation of residual THF by distillation (70° C., 10 mbar). It was obtained a poly (tetrahydrofuran diacetate) having the following properties: $M_n$ 2200; D 5.9 (GPC); yield 37%.

The concentration of acetic anhydride in the THF feed was then raised to 4 wt %. When the THF conversion had again reached a steady state, the effluent was again worked up by separation of residual THF by distillation (70° C., 10 mbar). There was obtained a poly(tetrahydrofuran diacetate) having the following properties: $M_n$ 760; D 8.3 (GPC); yield 48%.

Improved Preparation of Polytetrahydrofuran

Summary

A process for the preparation of a polytetrahydrofuran, a polytetrahydrofuran copolymer, diesters or monoesters of said polymers by the polymerization of tetrahydrofuran in the presence of at least one telogen and/or comonomer over a heterogeneous supported catalyst containing sulfate, wherein the heterogeneous supported catalyst containing sulfate contains at least one metal sulfate, metal hydrogensulfate, metal oxysulfate or a mixture thereof.

We claim:

1. A process for preparing polytetrahydrofuran, polytetrahydrofuran copolymers and diesters or monoesters of these polymers by polymerization of tetrahydrofuran in the presence of at least one telogen and/or comonomer over a sulfate-containing heterogeneous supported catalyst which is free of oxygen-containing tungsten and molybdenum compounds, wherein the sulfate-containing heterogeneous supported catalyst comprises at least one metal sulfate, metal hydrogen sulfate, metal oxide sulfate or a mixture thereof.

2. A process as claimed in claim 1, wherein the catalyst used is one whose support is selected from the group consisting of silicon dioxide, aluminum oxide, titanium oxide, zirconium dioxide and mixtures thereof.

3. A process as claimed in claim 1, wherein the catalyst used contains from 2 to 30% by weight, based on the total weight of the catalyst, of at least one metal sulfate, metal hydrogen sulfate, metal oxide sulfate or a mixture thereof.

4. A process as claimed in claim 1, wherein the catalyst used comprises a metal sulfate, metal hydrogen sulfate or metal oxide sulfate of group 1, group 3 including the lanthanides, groups 4, 7, 8, 10, 11, 12 and 13 of the Periodic Table.

5. A process as claimed in claim 1, wherein the catalyst used comprises titanium oxide sulfate, zirconium oxide sulfate, sodium hydrogen sulfate, a sulfate of Sc, Y, La, the lanthanides, Al, Cu, Ni, Zn, Mn(II) or a mixture thereof.

6. A process as claimed in claim 1, wherein the catalyst used comprises cerium(IV) sulfate, lanthanum(III) sulfate, yttrium(III) sulfate or a mixture thereof.

7. A process as claimed in claim 1, wherein the telogen and/or comonomer used is water, 1,4-butanediol, 2-butyne-1,4-diol, polytetrahydrofuran having a molecular weight of from 200 to 700 dalton, a $C_1$–$C_{20}$-monocarboxylic acid, a carboxylic anhydride derived from a $C_2$–$C_{20}$-monocarboxylic acid, 1,2-alkyleneoxide, 2-methyltetrahydrofuran, 3-methyltetrahydrofuran, a diol or a mixture of these telogens and/or comonomers.

8. A process as claimed in claim 1, wherein the telogen used is acetic anhydride.

9. A process as claimed in claim 1, wherein the polymerization is carried out in the presence of hydrogen.

10. A process as claimed in claim 1, wherein the catalyst is doped with at least one transition metal of groups 7 to 10 of the Periodic Table of the Elements.

* * * * *

UNITED STATES PATENT AND TRADEMARK OFFICE
CERTIFICATE OF CORRECTION

PATENT NO.: 6,124,368

DATED: September 26, 2000

INVENTOR(S): ELLER et al.

It is certified that error appears in the above-identified patent and that said Letters Patent is hereby corrected as shown below:

On the cover page, item [86], "PCT/EP98/05319" should be --PCT/EP98/03519--.

Signed and Sealed this

First Day of May, 2001

Attest:

NICHOLAS P. GODICI

Attesting Officer      Acting Director of the United States Patent and Trademark Office